J. Z. WALLING.
Apparatus for Breaking Horses.
No. 161,461. Patented March 30, 1875.
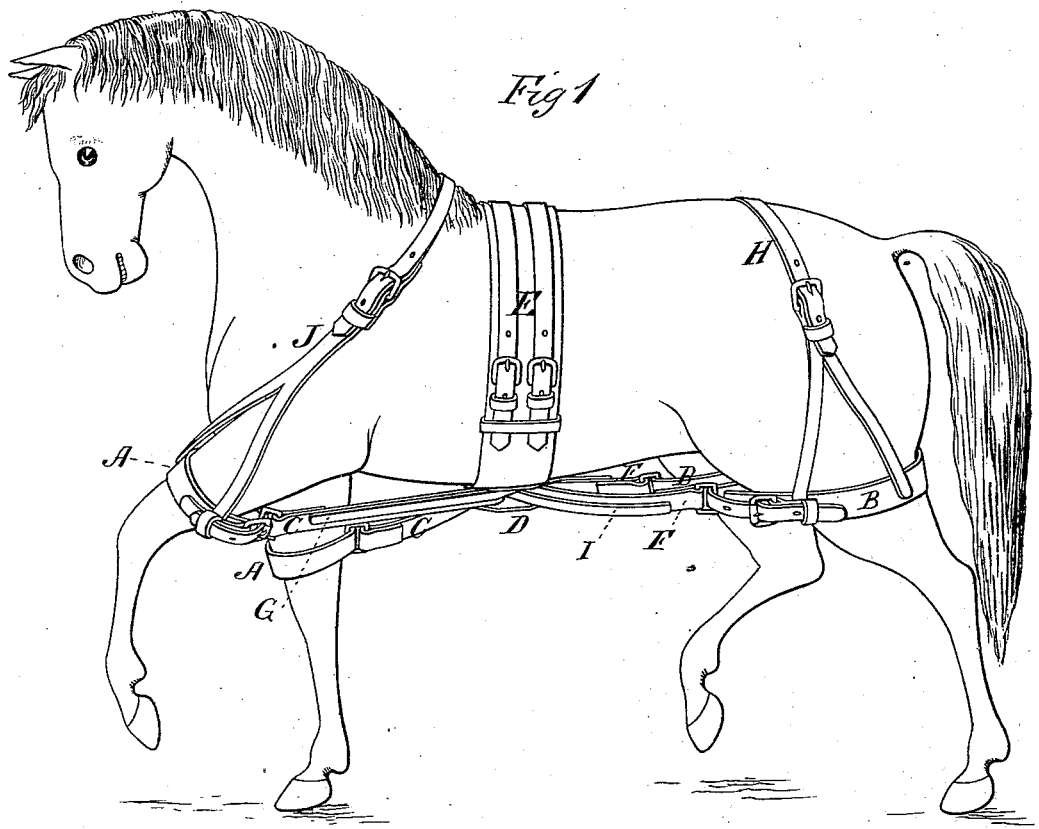
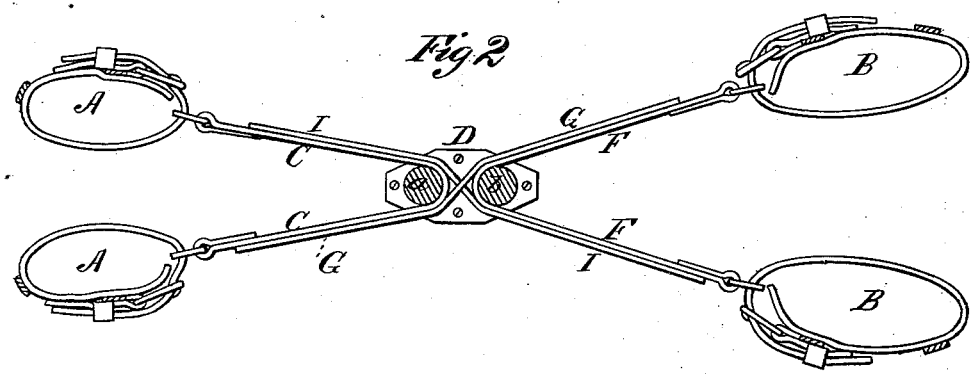
WITNESSES
Villette Anderson.
E. H. Bates
INVENTOR
John Z. Walling
Chipman Hosmer & Co.
ATTORNEYS

UNITED STATES PATENT OFFICE.

JOHN Z. WALLING, OF RED WING, MINNESOTA.

IMPROVEMENT IN APPARATUS FOR BREAKING HORSES.

Specification forming part of Letters Patent No. 161,461, dated March 30, 1875; application filed February 13, 1875.

*To all whom it may concern:*

Be it known that I, JOHN Z. WALLING, of Red Wing, in the county of Goodhue and State of Minnesota, have invented certain new and useful Improvements in a Horse-Breaking and Trotting Invention; and I do hereby declare the following to be a full, clear, and exact description of the invention, such as will enable others skilled in the art to which it pertains to make and use it, reference being had to the accompanying drawings, which form part of this specification.

Figure 1 of the drawings is a view of my device applied to a horse, and Fig. 2 is a plan view of the same.

This invention has relation to devices which are designed for breaking horses to a desired pace. The object of the invention is to compel a horse of bad habits, or a colt being broken to the saddle or to harness, to acquire a trotting gait by being prevented from cantering, loping, running, pacing, or any other gait than trotting. To this end the nature of the invention consists in combining with the straps passing around the pulleys, and secured respectively around the fore-arms and the hams of a horse, straps passing diagonally across the horse through the pulleys, and secured at each end to a fore-leg and a hind leg of the animal, whereby he is compelled to raise his hind and front legs on opposite sides in unison, and to acquire the pace called trotting, as will be hereinafter more fully explained.

In the annexed drawings, A designates a strong leather or webbing strap, buckled around the fore-arms of a horse, and B similar straps similarly secured around his hams. Straps A are united by means of a strap, C, which passes around a pulley-wheel, $a$, in one end of a block, D, which block is suspended and sustained under the belly of the animal by means of a surcingle, E; and straps B, by means of a strap, F, which passes around a second pulley-wheel, $b$, in the rear end of the said block, as shown. By this means the animal is allowed to walk freely, but is prevented from running and is effectually debarred from kicking. G designates a leather strap, rigidly secured to strap C near its point of union with straps or bands A, passing thence between pulley-wheels $a\ b$, diagonally across the body of the horse, when it is rigidly secured to strap F, near its point of union with strap or band B. In this manner one of the animal's fore legs is connected to one of his hind legs on the opposite side. The other fore and hind legs are connected by a strap, I, in a precisely similar manner, and, straps G and I being of half the width of strap C and F, no difficulty is experienced in passing them through block D, between its pulley-wheels $a\ b$. All the parts of the device above described having been fitted upon the horse while in a standing position, he may now be started ahead, when, upon stepping out with his right forefoot, he will be instructed, through the medium of diagonal strap I, to raise and extend his left hind foot in unison therewith; at the same time the left forefoot is tripped and drawn back by strap C, which loosens diagonal strap G, and allows the right hind foot to be thrown back in the efforts of the animal to avoid falling. By this means the right forefoot and left hind foot will be moved forward in unison at the same time that the left forefoot and right hind foot are moved rearwardly. The gait thus produced will be in the inception of the training irregular and jerky, but it will improve as the lessons continue, until it reaches a state of advancement which will justify the removal of the apparatus. Where a tendency to backsliding into an objectionable gait is evinced an occasional application of the hereinbefore-described device will reduce the animal to a compliance with a trotting gait, when, becoming a habit with him, it will, from preference, be adopted as his habitual mode of progression.

It will be seen from the above description that an animal provided with this device cannot kick, as such an attempt would trip up his fore-legs; that he cannot run, as by taking this gait the front and hind legs are thrown forward alternately; that he cannot pace, which requires that the front and hind legs on the same side should be thrown forward in unison and alternately with those on the other side. In fact, there is no gait which he could adopt except that of trotting.

In practice leg-bands A and B are held in place by means of straps H and J, passing respectively over the rump and withers of the animal, and adjustably secured in any suitable manner to the crupper and to the strap connecting the saddle and collar. In saddle-horses strap J will be preferably secured to the cantle of the saddle, though it may be simply passed in the manner of a breast-strap over the withers of the horse.

Having thus described my invention, what I claim as new, and desire to secure by Letters Patent, is—

The diagonal straps I and G, in combination with straps C and F, surcingle E, for supporting the pulley-block D, and straps or bands A B, substantially as and for the purpose set forth.

In testimony that I claim the foregoing I have hereunto set my hand this 11th day of January, 1875.

JOHN Z. WALLING.

Witnesses:
 AUGUSTINE B. HAWLEY,
 JAMES WINCHESTER.